Nov. 5, 1929.  E. W. FARLIN  1,734,082
ANIMAL POKING IMPLEMENT
Filed May 31, 1928
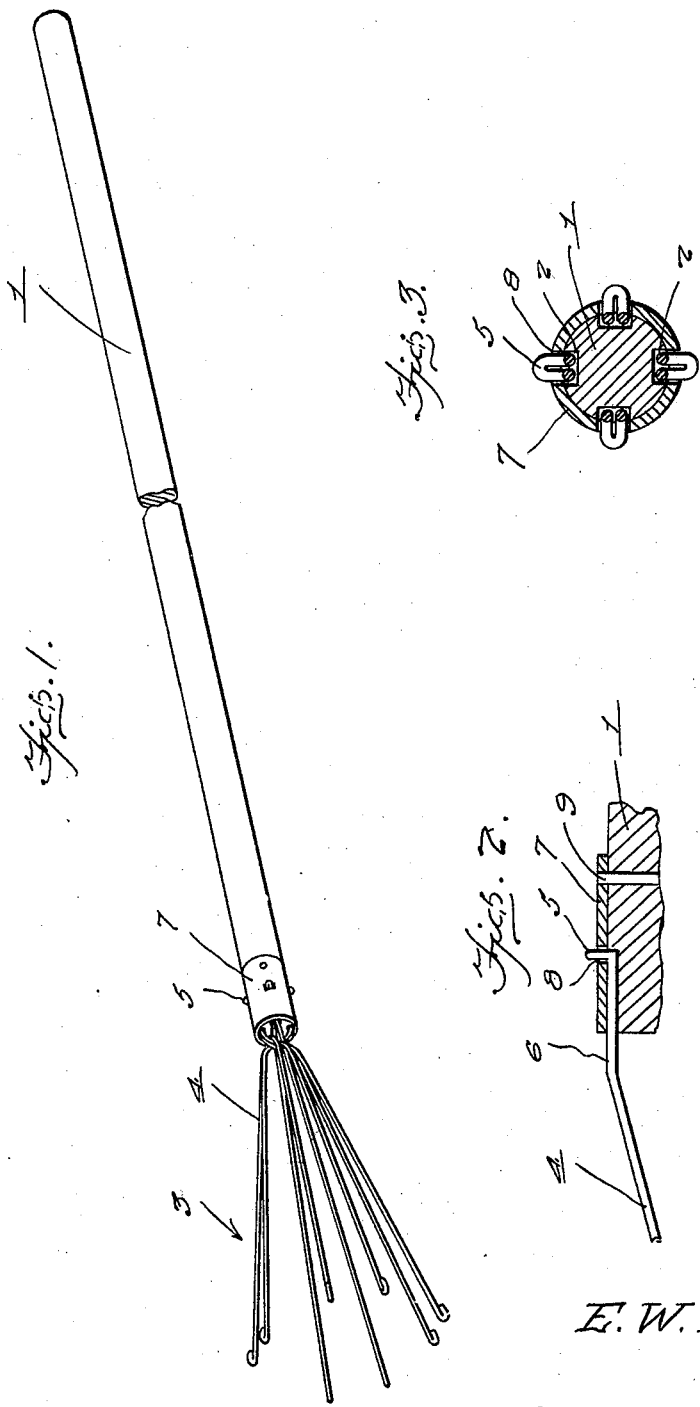
Inventor
E. W. Farlin
By Clarence A. O'Brien
Attorney Patented Nov. 5, 1929

1,734,082

UNITED STATES PATENT OFFICE

ELMER W. FARLIN, OF SPENCER, NEBRASKA

ANIMAL-POKING IMPLEMENT

Application filed May 31, 1928. Serial No. 281,718.

The present invention pertains to improvements in implements for handling animals and the same relates more especially to an implement adapted for guiding or directing animals, such as hogs by poking them with the prong members of this novel device.

The present method of handling these animals is by striking them on the side of the body opposite to the direction desired for them to travel, but it has been found that this method is, in reality, quite injurious to the animals, due to the fact that they must be struck quite hard in some cases, in order to cause them to obey.

The invention at bar eliminates any such injurious effects by providing an implement provided with projecting prong members of resilient material which will glance from the animal's body when the latter is poked thereby.

An important object of this invention resides in the provision of an implement constructed of light material, and requiring no physical exertion in using the same against animals in the act of directing them.

Another object resides in the provision of an implement of this character, wherein elongated springy prong members are adapted to project from one end of a handle, and wherein, further, these prong members may be easily removed from association with the handle for the purpose of repair or replacement.

Other objects and advantages of this invention will become apparent as the same is better understood from the following specification and claim.

In the drawings:

Figure 1 represents a perspective view of the entire implement.

Figure 2 represents a fragmentary sectional view of the end of the implement to which the prong members are secured, and Figure 3 is a cross sectional view through the end of the handle to which the prongs are secured, and disclosing the manner in which these prongs are associated with the handle.

Now, for a more detailed description of this invention, reference is made to the drawings, wherein like numerals designate like parts. An elongated handle 1 is formed at one end portion with a plurality of circumferentially spaced and inwardly disposed grooves 2. A plurality of prong members generally referred to by a numeral 3 are constructed of elongated strips or small rods of spring metal. In the construction of these prong members, a single strip or rod is bent at its intermediate portion so that its free ends will be disposed adjacent each other in the manner as shown in Figure 1. In this construction, a pair of prong members are provided.

The intermediate bent portion of the strip 4 is bent at right angles to itself, as at 5, while the outer portions toward the free ends of the strip are disposed obliquely at a portion 6, immediately adjacent to the right angularly disposed bent portion 5.

As is clearly shown in Figures 2 and 3, respectively, the portion 6 of each strip is disposed within a recess 2 at the end of the handle 1, when these prongs are connected to the handle in the manner to be fully described hereinafter.

A metallic ferrule 7 is constructed for snug engagement over the grooved end of the handle 1 and is provided with a plurality of circumferentially spaced openings 8, each of which is registerable with a corresponding groove 2 of the handle, when the ferrule is properly arranged on the handle.

In assembling, the prong members in connection with the handle, the laterally bent intermediate portions 5 of the respective strip 4 are arranged to project through the openings 8 in the ferrule 7. With the prong members in this position, the ferrule is slipped over the grooved end of the handle, so that the portions 6 of the strip 4 will be seated in corresponding grooves 2 of the handle. When the ferrule has been slipped inwardly sufficiently on the handle, so that the bent portions 5 of the strip abut the inner ends of the grooves 2, a suitable rivet 9 may be employed for securing the ferrule rigidly to the handle and maintaining the prongs 3 in the proper position. The obliquely disposed portions of the respective strips 4 are so disposed as to intercross each other in the manner clearly shown in Figure 1.

Although the preferred form of this invention is disclosed in the drawings, it is to be known that certain changes may be made in the shape, size or materials without departing from the spirit of this invention or the scope of the appended claim.

Having thus described my invention, what I claim as new is:

An animal poke comprising a handle, a plurality of prong members disposed in diverged relation at one end of the handle, said members being constructed of spring material and bent at their free ends against themselves to provide blunt ends.

In testimony whereof I affix my signature.

ELMER W. FARLIN.